June 6, 1961 C. E. PALLAS 2,987,633

ZERO SUPPRESSED PULSE STRETCHER

Filed April 28, 1959

INVENTOR.
CHARLES E. PALLAS

United States Patent Office 2,987,633
Patented June 6, 1961

2,987,633

ZERO SUPPRESSED PULSE STRETCHER

Charles E. Pallas, St. Paul, Minn., assignor, by mesne assignments, to the United States of America as represented by the Secretary of the Navy Filed Apr. 28, 1959, Ser. No. 809,584
2 Claims. (Cl. 307—88.5)

This invention relates to a pulse stretcher and more particularly to pulse stretching circuits employing semiconducting devices.

In digital computing systems, data processing problems can normally be represented by a simple pattern of ones and zeros known as the binary code. The storing or "memorizing" of such binary information in digital computers requires the use of bi-stable devices, that is, devices exhibiting two, easily distinguishable states, which, when placed in any one of the states, will remain in that state as long as desired. The storage element therefore must possess two stable states and these may be considered as representing binary one and binary zero.

Although a zero signal is arbitrarily defined as the absence of any pulse, in magnetic core circuitry, such a signal may be expected to emanate from these storage elements and will normally be of sufficient duration and magnitude to cause unwanted responses in computer circuitry.

Accordingly, it is a broad object of this invention to eliminate the unwanted response to the zero input signal in a pulse stretcher and yet maintain the full effect of a one signal.

Another object of the invention is to provide a circuit which will suppress the zero input pulse signal in a pulse stretcher and yet generate a pulse of the one input signal several times wider than the one input pulse signal.

With the above and other objects in view as may hereinafter appear, reference is made to the drawings wherein.

Figure 1:
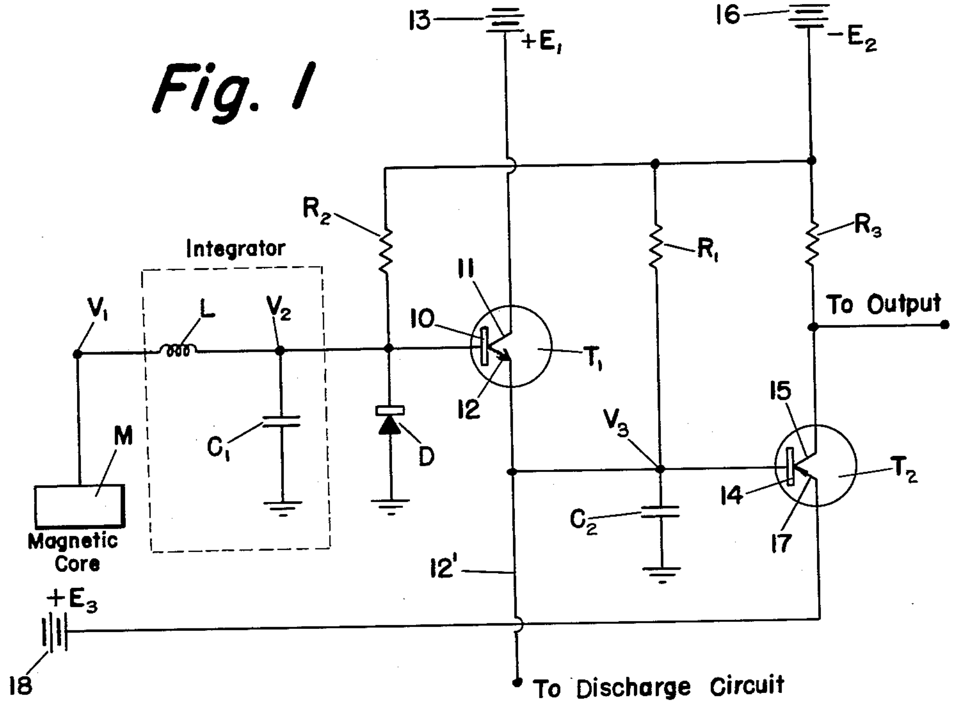
FIG. 1 is a circuit diagram of a pulse stretching circuit embodying the present invention.

Referring to the drawings and more particularly to FIG. 1 thereof, there is shown an integrating circuit consisting of inductor L and condenser $C_1$ which integrates at $V_1$ the input pulses or waveforms which are emitted from a magnetic core logical switching circuit M and results in integrated waveforms at $V_2$. The integrating circuit aforementioned functions to distinguish between the one and zero input signals and serves to reduce the voltage amplitude of the zero signal to a tolerable level.

The integrated waves at $V_2$ are applied to NPN transistor $T_1$ at its base electrode 10 and the transistor has a collector electrode 11 and an emitter electrode 12. A battery 13 is poled to apply a positive voltage of $+E_1$ volts to the collector electrode 11 of transistor $T_1$ while its emitter electrode 12 is fed by line 12′ into a discharge circuit. A second transistor $T_2$ of the PNP type with a base electrode 14 has its collector electrode 15 connected to the negative pole of a second battery 16 of $-E_2$ volts and the emitter electrode 17 of the second transistor $T_2$ is connected to the positive pole of a third battery 18 of $+E_3$ volts. Voltage point $V_3$ is located between the emitter 12 of transistor $T_1$ and base electrode 14 of transistor $T_2$ and a resistor $R_1$ provides a discharge path from $V_3$. When the voltages or pulses at $V_2$ are more positive than the $+E_3$ voltage applied to the emitter electrode 17, the transistor $T_1$ will conduct in an emitter-follower configuration and thus rapidly charge a capacitor $C_2$, the transistor $T_1$ providing a low impedance path therethrough. As capacitor $C_2$ is charging positively, transistor $T_2$ then will tend to be rendered non-conductive, the voltage on capacitor $C_2$ following the waves at $V_2$ until the waves have peaked, whereupon transistor $T_1$ will cut off. So long as the pulse voltages at $V_3$ are more positive than the $E_3$ voltage, transistor $T_2$ will remaian non-conductive, however, capacitor $C_2$ will discharge slowly through a resistor $R_1$ and lose its positive charge and when the discharge has proceeded to such an extent that the $E_3$ voltage is more positive than the voltage at $V_3$, transistor $T_2$ will conduct. The discharge rate of capacitor $C_2$ through resistor $R_1$, controlled by the ohmic value of resistor $R_1$, determines the maximum width of the stretched output pulse of transistor $T_2$.

A diode D is connected to base electrode 10 of transistor $T_1$ to prevent the base electrode from acquiring a negative charge and D will conduct when a negative charge occurs at $V_2$. A pair of stabilizing resistors consisting of base resistor $R_2$ and a load resistor $R_3$ are provided between the source of the negative potential of battery 16 and the base electrode 10 of transistor $T_1$ and the collector electrode 15 of transistor $T_2$ respectively. Since the voltage at $V_2$, impressed on the base electrode 10 of transistor $T_1$ by a zero input signal, is less than the emitter bias voltage of $+E_3$ volts of transistor $T_2$, transistor $T_1$ will remain non-conductive during a zero input signal. However, when a one input signal is applied to transistor $T_1$, the voltage at $C_1$ will be more positive than the $+E_3$ voltage and transistor $T_1$ will charge capacitor $C_2$ and render transistor $T_2$ non-conductive.

Figure 2:
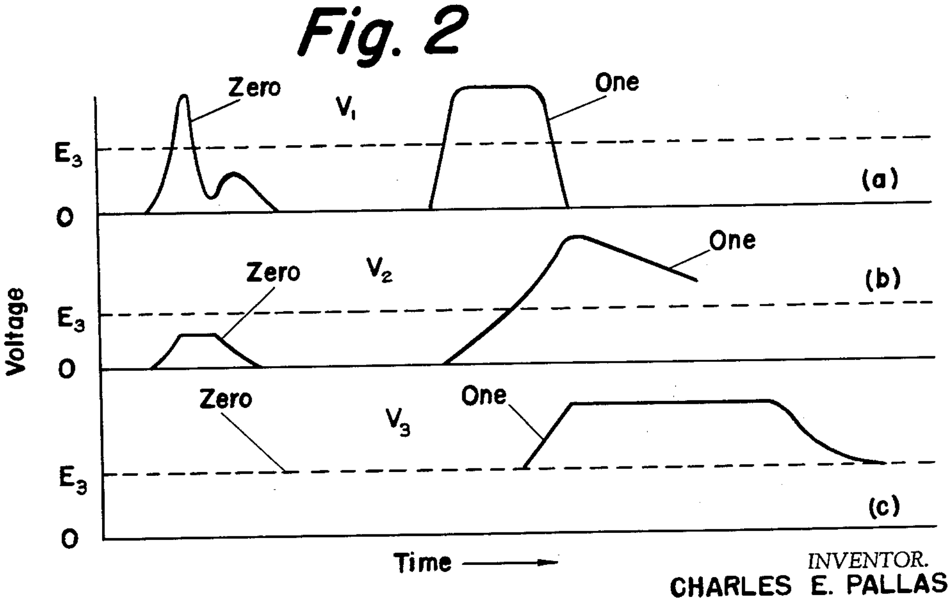
FIG. 2 is a time-voltage chart showing the zero and one waveforms at various points of the circuit of FIG. 1.

The waveforms, pulses or voltages appearing at points $V_1$, $V_2$ and $V_3$ are graphically illustrated in FIG. 2 of the drawings. As illustrated in FIG. 2*a* and as previously described, a zero and one waveform of the type shown may be expected from a magnetic core logical switching circuit. At 2*b*, the waveforms have been integrated by the L–$C_1$ integrating circuit while at point $V_3$, the zero signal has been entirely suppressed and the one signal lengthened as shown.

A pulse from the magnetic core logical switching circuit M having a one microsecond duration was stretched to approximately 16 microseconds' duration using the above described circuitry when the following values of circuit components and transistor types were used:

| | |
|---|---|
| L | 200 microhenries. |
| $C_1$ | 1000 micromicrofarads. |
| $C_2$ | 1000 micromicrofarads. |
| $R_1$ | 56K ohms. |
| $R_2$ | 4.7K ohms. |
| $R_3$ | 13.6K ohms. |
| $T_1$ | 2N94A, NPN. |
| $T_2$ | GT–122A, PNP. |
| $E_1$ | +8 volts. |
| $E_2$ | −14 volts. |
| $E_3$ | +5 volts. |

While there has been disclosed what is at present considered to be the preferred embodiment of the invention, other modifications will readily occur to those skilled in the art. It is not, therefore, desired that the invention be limited to the specific circuitry shown and described, and it is intended to cover in the appended claims all such modifications as fall within the true spirit and scope of the invention.

What is claimed is:

1. A pulse responsive circuit comprising a magnetic core pulse source for emitting zero and one signals, a first transistor and a second transistor, an integrating circuit between said pulse source and the base of said first transistor, a positive potential connected to the collector of the first transistor and a negative potential connected to the collector of the second transistor for clamping the zero signal, a capacitor between the emitter of the first transistor and the base of the second transistor, a positive bias voltage connected to the emitter of the second transistor having a value greater than the zero signal from the pulse source and effective for maintaining the first transistor non-conductive during the zero signal and a lesser value than the one signal for maintaining the first transistor conductive during the one signal to provide for charging the capacitor, said second transistor being non-conductive during the charging of the capacitor, a discharging resistor connected to the capacitor having a value determinative of the width of the stretched pulse and an output pulse line between the collector of the second transistor and the negative potential.

2. A pulse responsive circuit as in claim 1, further characterized by one stabilizing resistor between the base of the first transistor and the negative potential and a second stabilizing resistor between the collector of the second transistor and the negative potential.

References Cited in the file of this patent

UNITED STATES PATENTS

| | | |
|---|---|---|
| 2,532,843 | Houghton | Dec. 5, 1950 |
| 2,710,347 | Brady | June 7, 1955 |
| 2,716,189 | Ayers | Aug. 23, 1955 |
| 2,719,225 | Morris | Sept. 27, 1955 |
| 2,789,267 | Beal | Apr. 16, 1957 |
| 2,885,662 | Hansen | May 5, 1959 |

OTHER REFERENCES

Principles of Transistor Circuits by R. F. Shea, published 1953, by John Wiley & Sons, N.Y., page 425.

Transistor Circuit Engineering by R. F. Shea, published 1957, by John Wiley & Sons, N.Y., page 56.